Jan. 12, 1965  R. C. GIESSE ETAL  3,165,470
LIQUID COALESCING AND SEPARATING APPARATUS
Filed Nov. 2, 1959  3 Sheets-Sheet 1

INVENTOR.
ROBERT C. GIESSE
WILLIAM C. SMITH
BY

Jan. 12, 1965  R. C. GIESSE ETAL  3,165,470
LIQUID COALESCING AND SEPARATING APPARATUS
Filed Nov. 2, 1959  3 Sheets-Sheet 2
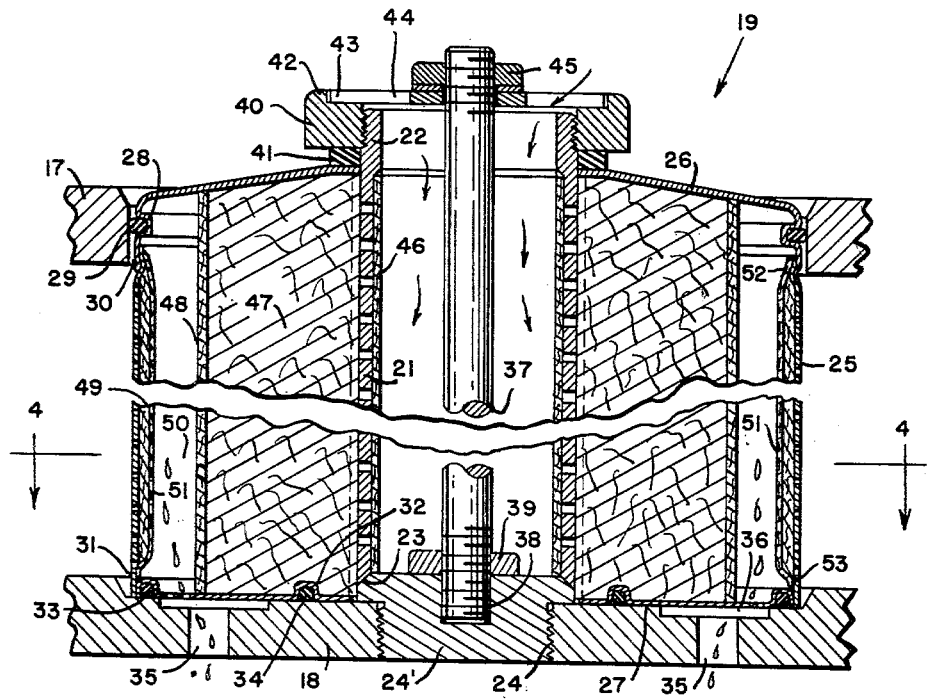
FIG. 3
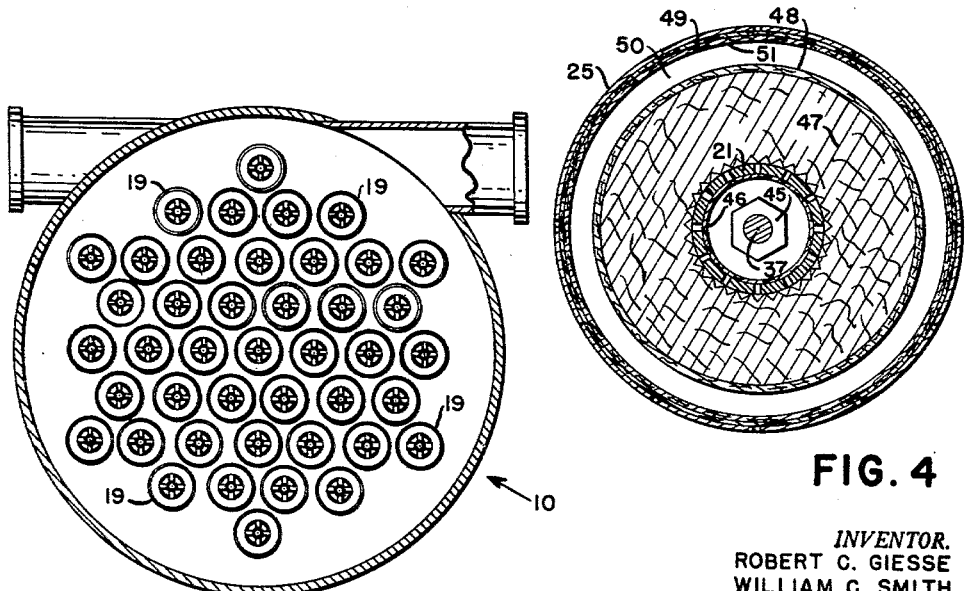
FIG. 2
FIG. 4
INVENTOR.
ROBERT C. GIESSE
WILLIAM C. SMITH
BY Jan. 12, 1965  R. C. GIESSE ETAL  3,165,470
LIQUID COALESCING AND SEPARATING APPARATUS
Filed Nov. 2, 1959  3 Sheets-Sheet 3

INVENTOR.
ROBERT C. GIESSE
WILLIAM C. SMITH
BY

United States Patent Office 3,165,470
Patented Jan. 12, 1965

3,165,470
LIQUID COALESCING AND SEPARATING
APPARATUS
Robert C. Giesse, Bettendorf, Iowa, and William C. Smith, Moline, Ill., assignors to Ametek, Inc., New York, N.Y., a corporation of Delaware
Filed Nov. 2, 1959, Ser. No. 850,309
2 Claims. (Cl. 210—307)

The present invention relates to filters for handling an admixture of a multi-phase system which may include a solid phase, and polar and nonpolar liquid phases of different densities, and apparatus for filtering liquid fuel to remove therefrom water and solid foreign matter.

In the fueling of certain aircraft, liquid fuel often includes solid foreign matter and water which latter may occur as an admixture with the liquid fuel and be present by virtue of condensation or otherwise. These fuels often contain many additives, such as dimethylhydrazine, carbonates and sulphates, for imparting operating and storage characteristics to the fuel.

It has previously been proposed to employ resin-impregnated glass wool as a filtering medium, and although this is moderately satisfactory in filtering of certain liquid fuels so long as the flow rate and the moisture content are low, it has proven unsatisfactory where the moisture content is high and is wholly ineffective for certain other liquid fuels such as the high additive fuels above referred to regardless of the water content.

The principal object of the invention is to provide an apparatus for the removal of solids and/or a polar liquid as a discontinuous phase from a nonpolar liquid continuous phase of different density within an admixture of said phases.

Another object of the invention is to provide an apparatus for filtering liquid fuels in which solid foreign matter larger than about 3–5 microns and all free water are removed from regular and high additive liquid fuels.

Another object of the invention is to provide such a filtering apparatus in which particles or fibers, either natural or synethic, are coated with a material such as polyethylene of sufficient concentration to provide a profusion of knob-like protuberances that tend to cause a superior coalescing of a polar liquid as a discontinuous phase from a nonpolar liquid continuous phase of different density.

In one aspect of the invention, a filtering apparatus may comprise a housing containing a plurality of parallel arranged filtering tubes, into the center of each of which an admixture of polar and nonpolar liquid phases of different density and which may include a solid phase is fed from a storage tank. The individual tubes may be identical and may comprise an inner perforated metal retainer, to the outer surface of which may be applied a liner made from natural or synthetic fibers either in woven or nonwoven form, and about the outer surface of which may be attached an annular layer of natural or synthetic fibers coated with a material tending to cause the polar liquid within the admixture to coalesce as the admixture passes transversely through the layer of coated fibers. The layer of coated fibers may be surrounded by a material tending to cause the coalesced polar liquid to larger droplets as the admixture passes transversely therethrough.

Preferably the fibers are coated (not impregnated) with either branch or linear polyethylene. Polyethylene is the generic term applied to a basic plastic resin made from monomer ethylene gas. Its molecular structure is essentially a long straight chain paraffin. Typical of paraffin structures, polyethylene is chemically inert in most environments and is thermoplastic.

Regular (branch) polyethylene is polymerized at high pressures and temperatures. The resulting polyethylene structure is a long chain with many alkyl or vinyl structures branching from the main trunk of its molecular chain. This branching in the otherwise linear chain is important to some of the desirable properties of regular polyethylene, such as impact strength.

Catalytic (linear) polyethylene is polymerized with the aid of a catalyst under milder conditions of pressure and temperature. The resulting structure is a long chain with an orderly molecular arrangement with small discontinuities and little branching.

Polyethylene exhibits an amorphous-crystalline structure. Branch polyethylene is about 60% crystalline, and linear polyethylene is more than 90% crystalline at room temperature. Increased crystallinity gives higher tensile strength, lower permeability and lower elongation physical characteristics.

It has been found that the process of coating fibers with polyethylene by direct polymerization of the polyethylene structure on the base fiber generates a film of polyethylene on the fiber base material. Approximately 10–15% by weight polyethylene content results in a thin uniform film over the fiber surface. On increasing the polyethylene content up to about 50% (not limiting), the polymer continues to grow. The continued growth, however, adds very little to the film thickness, but instead produces a peculiar "knoblike" growth that mushrooms from many points on the coated fiber surface. When coated fibers having this particular conformation of polyethylene, developed by coating some base material, are employed as filter media, a superior filter element having a coalescing characteristic is produced.

In another aspect of the invention, an annular space may be provided between the annular layer of coated fibers and an outer perforated retainer, to the inner peripheral surface of which may be attached an annular layer of a material capable of freely passing the liquid fuel transversely through it but resistant to the passage therethrough of the coalesced water.

In another aspect of the invention, only the annular space between the annular layer of fibers and the outer retainer may be in communication with a sump, into which may flow the coalesced water removed from the liquid fuel. As the quantity of water collected within the sump increases to a predetermined level, it may be caused to flow to a drain. Should the level of collected water in the sump increase to a predetermined depth, it will render ineffective that portion of the filter tubes in contact with it. Accordingly, in another aspect of this invention, means may be provided to recirculate the fuel and water admixture if the collected water increases to a predetermined depth, and until the accumulated water within the sump is restored to a predetermined amount as determined by the capacity of the drain valve. Preferably, a small amount of fuel above the water level is recirculated at all times to insure a constant downflow and aid in the settling of the water droplets.

The above, other objects and novel features of the invention will become apparent from the following specification and accompanying drawings which are merely exemplary.

In the drawings:

FIG. 2 is a sectional plan view taken substantially along line 2—2 of FIG. 1;

FIG. 3 is a broken sectional elevational view through one of the filtering tubes of FIGS. 1 and 2;

FIG. 4 is a sectional plan view taken substantially along line 4—4 of FIG. 3;

Figure 1:
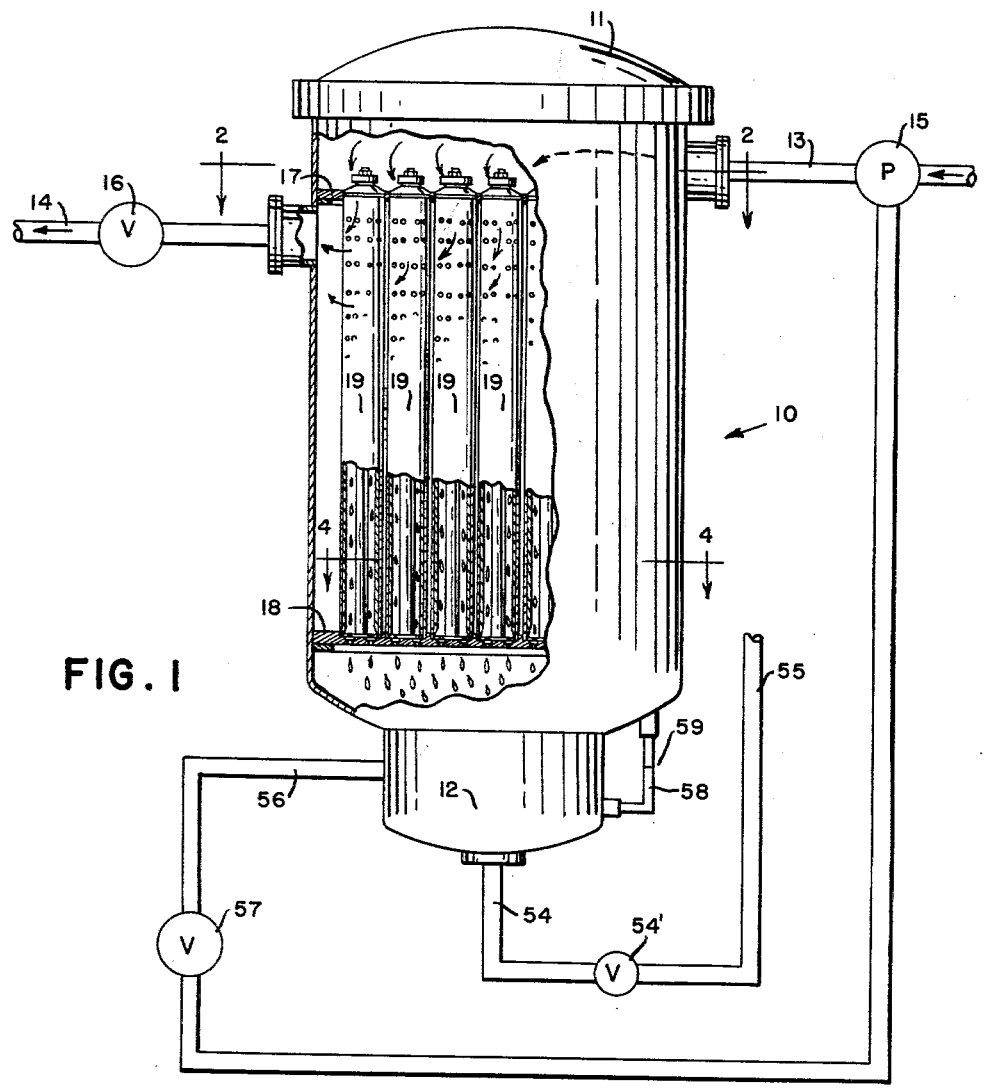
FIG. 1 is an elevational view of an apparatus to which the principles of the invention have been applied.

Referring to the drawings, and particularly to FIG. 1, the principles of the invention are shown as applied to a filtering system including a filtering housing 10 which may be generally of cylindrical form, although any desired cross sectional form will suffice. The housing 10 may have a closed top 11 and a sump portion 12 at its bottom. It may also include a fuel inlet line 13 and a fuel outlet line 14, in the former of which may be located a pump 15 and in the later of which may be located a valve 16 for a purpose to be described later.

In the embodiment shown in FIG. 1, a baffle plate 17 may be provided near the top 11 of housing 10, below inlet line 13 and above outlet line 14. Another baffle 18 may be located near the bottom of housing 10 and above the sump 12. While the embodiment shown in the drawings has been designed to handle the removal of water from a hydrocarbon fuel wherein the sump is located in position to receive water droplets that settle through the fuel, should other coalesced liquid be of less density than the continuous nonpolar phase, the sump may be located at the top of the filtering apparatus with the inlet of the admixture located at the bottom of the filtering apparatus.

Between the baffles 17 and 18 may be located a plurality of filtering tubes 19 of substantially identical design, the inner portions of tubes 19 being in communication with the chamber in housing 10 formed by, and above, baffle 17, while only an annular space within each tube 19 is in communication with the sump 12 below the baffle 18 as will be explained later.

Referring to FIGS. 3 and 4, each of the filtering tubes 19 may comprise an inner perforated metal retainer tube 21 having its upper end 22 threaded and its lower end 23 beveled for a purpose to be explained. The lower baffle 18 may be provided with spaced threaded openings 24 for threadingly receiving a fitting 24' having a beveled surface adapted to mate with the bevel 23 at the bottom of retainer 21. Each filtering tube 19 may also include an outer perforated metal retainer 25 that is joined to a compression cover 26 at its top and to an annular plate 27 at its bottom. The cover 26 may be provided with a groove 28 adapated to receive an O-ring 29 that forms a seal between each tube 19 and the peripheral wall of a corresponding opening 30' formed in the baffle 17 and adapted to receive a filtering tube 19.

The bottom plate 27 may include grooves 31 and 32 for the reception of O-rings 33 and 34 for providing a seal between each tube 19 and the top of baffle 18 so that liquid may drain through perforations 36' into one or more passages 35 extending from an annular groove 36 to the sump 12.

A threaded rod 37 may be threaded into a threaded recess 38 in the fitting 24' and may be locked thereto by a lock nut 39. A nut 40 may be threaded onto the top 22 of each inner retainer 21 and act through a seal 41 to compress cover 26 and retain each tube filter 19 in place. The nut 40 may be provided with a recess 42 into which may extend a flange 43 of a spider 44, through the center of which the threaded rod 37 may extend. A jamb nut 45 may be threaded onto the top of rod 37 to effectively lock each filter tube 19 in its proper place.

Referring to FIG. 4, an annular layer 46 of filtering media may be attached to the inner peripheral surface of the perforated inner retainer 21. This layer 46 may be made from natural or synthetic fibers, either woven or nonwoven. In the embodiment described, the layer 46 is made of nylon fibers and is capable of filtering out as much as 95 to 98 percent of the solids within the liquid fuel being treated. Although any type of filtering media may be employed, it has been found that one turn of 12-ounce or two turns of 6-ounce nylon felt provides very satisfactory results. Furthermore, this filtering layer 46 may be dispensed with in certain installations; however, this obviously will reduce the total solids capacity of the element.

Surrounding the exterior of the inner retainer 21 may be a substantially thick annular layer or core 47 of material that tends to cause water within the fuel to coalesce. The annular layer or core 47 may be made from natural or synthetic fibers, either woven or nonwoven, and coated with polyethylene to produce the peculiar "knob-like" growth previously described. Furthermore, the annular layer 47 can involve the above referred to process followed by digestion and leaching of the base fiber, leaving a pure polyethylene core having essentially the peculiar "knob-like" configuration. Additionally, such layer 47 can involve coating relatively soluble material such as sodium chloride crystals of some particular desired particle size that can be easily washed out after having been coated, formed and set.

In addition, the action of the core 47 may be varied by shifting certain physical properties such as increasing or decreasing the polyethylene content which may result in more or less growth of the "knob-like" structure which could effect changes in density, compressibility and porosity; and varying the base material coated with the polyethylene, resulting in changing the characteristics of the coating structure, thereby controlling the liquid-solid retention of the core, varying the porosity as well as the pressure drop through the core and also altering its surface activity.

It has been found that relatively short cellulose fibers that have been coated with polyethylene are particularly satisfactory to cause any water within the fuel to coalesce and form droplets. One particularly good short length cellulose fiber, which is known in the trade as "Solka-Floc BW40," when coated with polyethylene, produces remarkable results. It has a fiber length in the neighborhood of between 20–100 microns. Another short cellulose fiber coated with polyethylene is known in the trade as "Nalcon," manufactured by The National Lead Corporation.

The formed tubular core 47 of coated fibers may then be placed between perforated metal retainers and heat-set by placing the assembly into a jig or clamp. The heatsetting operation may be for about three hours at about 115° C. and if the core is not restrained, it will expand on heating. Of course, the time-temperature relationship may be varied by decreasing the time and increasing the temperature, or vice versa.

The heat-setting operation provides a stable core in which the polyethylene, when heated, softens and mechanically bonds polyethylene film to polyethylene film as these surfaces contact each other, does not diminish the porosity of the core, and maintains a maximum of surface area of polyethylene.

While the core 47 may be formed in the above described manner, it may be formed by first making sheets of polyethylene coated material that may or may not be preset by vacuum deposition, preweaving, gravity deposition, heat- or pressure-setting, and then wrapped spirally or cylindrically in one or more layers and then finally heat-set.

While coated "Solka Floc" and "Nalcon" fibers have been extremely satisfactory, it is to be understood that the core 47 may also be made from other polyethylene coated fibers or related materials preformed and heat-set as membranes wrapped or otherwise formed into a core of one or more layers. Furthermore, the inner periphery of the core 47 may be corrugated by either forming longitudinal ridges, horizontal ridges, spiral ridges or a combination of such ridges. Surrounding the core 47 may be one or more layers 48 of washed cotton muslin or the like for a purpose to be described later.

The outer perforated metal retainer 25 may have attached to its inner periphery, an annular layer 49 of nonwater wettable material capable of transversely passing the dry liquid fuel therethrough, but inhibiting the passage of water therethrough. The construction is such that an annular void 50 is provided between the polyethylene-coated cellulose fiber core and the layer 49 of nonwater wettable material. The void 50, of course, contains the liquid fuel and the coalesced droplets of water which, in the embodiments disclosed, settle therethrough and discharge into the sump 12 through the passage 35.

The layer 49 of nonwater wettable material may be any media of selective permeability. The layer 49 may be held in place by cementing a retaining layer 51 of paper or cloth along annular surfaces 52 and 53 at the top and bottom, respectively, of the inner peripheral surface of the outer retainer 25. Although nylon Vinyon has been used for the layer 49, other equivalent means may be employed such as micro-porous polyethylene and fluoro-carbons (Kel–F and Teflon), as produced by ESB-Reeves, Yardley, Pennsylvania. Furthermore, a thin felt made from the polyethylene-coated fibers compressed to a paper texture and heat-set may also be employed for the layer 49.

From the foregoing it is evident that liquid fuel flowing through line 13 (FIG. 1) passes into the chamber in housing 10 above baffle 17, thence flows downwardly into the interior of each inner retainer 21, thence transversely through the layer 46, thence transversely through the core 47 of fibers coated with polyethylene to the void or chamber 50.

It can be theorized that any moisture admixed with the liquid fuel is caused to coalesce in passing through the core 47 and as it wets the muslin 48, it is formed into larger water droplets which do not pass through the hydrophobic layer 49 but settle through the fuel within void 50 and collect in annular ring 36, thence pass through openings 35 to the sump 12. The dry liquid fuel passes transversely through the nonwater wettable layer 49 and flows outwardly from the housing 10 through line 14.

In certain installations, it may be desirable to eliminate the layer of nonwater wettable material 49. In such a case, the outer perforated retainer 25 may surround and lie in contact with the core 47, in which case the coalesced water droplets settle through the liquid fuel and collect as a mass in the sump 12, on the top of which the dry fuel may be supported.

Referring again to FIG. 1, an outlet line 54 from the bottom of sump 12 may be connected to an overflow 55 leading to a drain. A valve 54' may be located in line 54 for controlling the flow of water to the drain. It will be apparent from FIG. 1 that should the level of collected water within sump 12 rise above the baffle 18, the effectiveness of the tubular filters 19 will thereby be lessened. Accordingly, a line 56 leading from sump 12 may include a valve 57 and may be connected to the suction side of pump 15. Additionally, a sight gauge 58 may extend between the sump 12 and the chamber within housing 10 below the baffle 18. In this way, a line 59 between the water and dry fuel above it will be readily visible in gauge 58.

When the level of water within sump 12 rises to a predetermined height, valve 57 may be opened wider and valve 16 closed so that the fuel and water at the upper level of sump 12 may be recirculated until the level of water within sump 12, as evidenced by gauge 58, falls to a desired level when valve 54' is manipulated. In this way, a maximum efficiency of the filter tubes 19 is assured.

Figure 5:
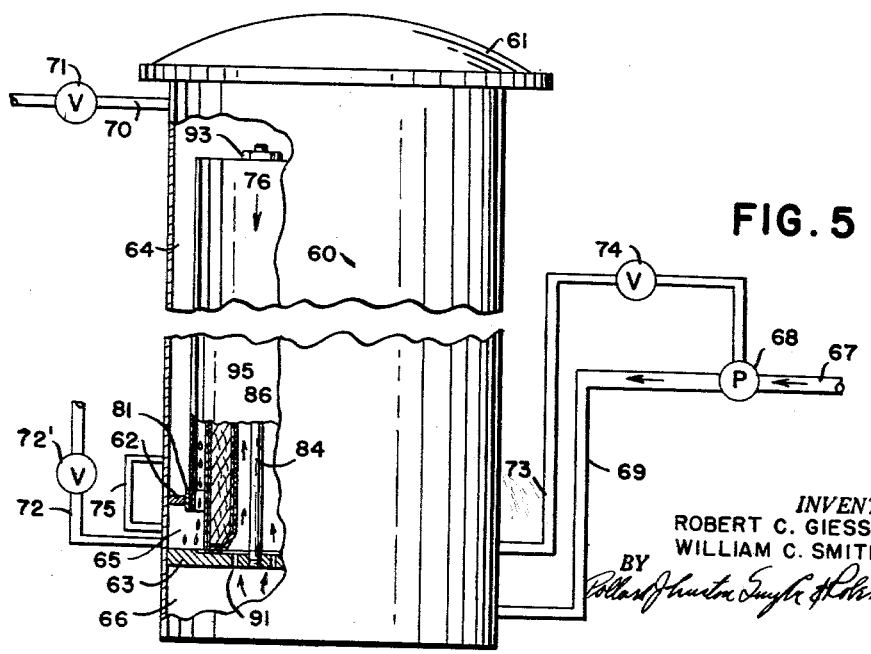
FIG. 5 is an elevational view of a modified form of the apparatus shown in FIG. 1.

Referring to FIG. 5, the principles of the invention are shown as applied to a modification of the apparatus shown in FIGS. 1 to 4, inclusive. A housing 60 may include a removable cover 61 and two separated, parallel baffle plates 62 and 63 near the bottom of the housing 60, dividing the interior of housing 60 into three compartments, namely, a fuel collecting chamber 64, a sump 65 and a fuel inlet chamber 66.

A line 67 may include a pump 68 and a portion 69 connected to the chamber 66. A fuel outlet line 70 may be connected near the top of housing 60 and may include a valve 71. An outlet 72 from the sump 65 may include a valve 72' and lead to a drain. A line 73 may extend from the sump 65 to the suction side of pump 68, and a control valve 74 may be located in line 73. Furthermore, a liquid gauge 75 may be connected between chambers 65 and 64 and may function in the same way that gauge 58 functions in FIG. 1.

Figure 6:
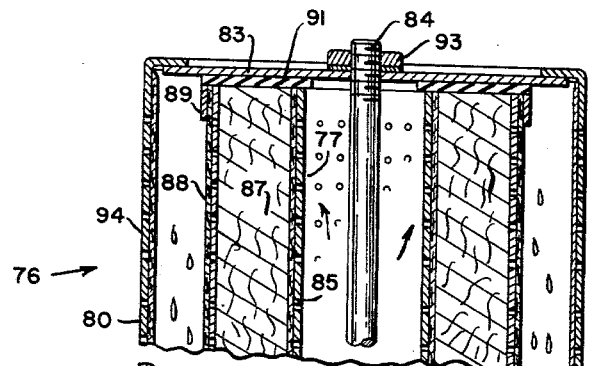
FIG. 6 is a sectional elevational view through one of the tubes of FIG. 5.
Figure 7:
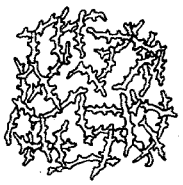
FIG. 7 is a magnified view of fibers showing the protuberances thereon.

A plurality of filtering tube devices 76 may be located within the chamber 64. Referring to FIG. 6, each of the filtering tube devices 76 may comprise an inner perforated tube 77 having its lower end flared at 78 and joined to an annular imperforate member 79. Each device 76 may also include an outer perforated retainer 80 that is fixed to the walls of a cylinder 81 forming a passage 82 between chambers 64 and 65. The upper extremity of the outer retainer may be fixed to an imperforate disc 83 having a central hole for the reception of a threaded rod 84 that is threaded into the baffle 63. An annular layer 85 of loose felt nylon or the equivalent may be attached to the outer periphery of the tube 77. A core 86 of the material used for core 47 of FIG. 3 may surround and lie in contact with the layer 85 of felt.

Surrounding the core 86 may be an intermediate perforated retainer 87, similar to the retainer 77, and it may be fixed at its lower end to the outer periphery of the member 79. The intermediate retainer 87 may be covered with one or more layers of washed cotton muslin 88, the number of layers and the weave varying to control water droplet formation and prevent migration of the filtering media of core 86. The layer or layers 88 may be held to the intermediate retainer 87 by clamps 89 and 90 at the top and bottom, respectively, of the retainer 87.

A rubber gasket 91 may be located between the disc 83 and the top of the retainers 77 and 87. Additionally, another gasket 92 may be located between the baffle 63 and the annular member 79. A nut 83 may be threaded onto the top of rod 84 in a manner to force the disc 83 into contact with gasket 91 and provide a seal between it and the tops of the retainers 77 and 87, as well as between the annular member 79 and the baffle 63.

The inner peripheral surface of the outer retainer 80 may be covered with a layer 94 of nonwater wettable material similar to the layer 49 of FIG. 3. The outer retainer 80 may be made of any rigid perforated material such as metal, and may be coated with resin or fluoroethane (Teflon, Kel–F) if desired. Furthermore, if the retainer 80 is made of Monel screening of about 100-mesh, the layer 94 of nylon Vinyon felt or its equivalent may be omitted. The construction and arrangement of the parts are such that the outer and intermediate retainers 80 and 87 form an annular space 95 between them that opens into the sump 65 and provides a settling space for the coalesced droplets of water within the fuel passing transversely through the tube devices 76.

A series of ports 96 surrounding the threaded rod 84 may provide communication between the inlet chamber 66 and the interior of the inner retainer 77.

From the foregoing it is evident that liquid fuel may be pumped into chamber 66 by pump 68, from which it passes upwardly through ports 96 into the interior of the inner retainer 77 of each device 76. The liquid fuel is then forced transversely through the perforated retainer 77, the loose felt layer 85, and the core 86 where water within the fuel is coalesced into droplets. The mixture then passes transversely through the intermediate retainer 87 and the muslin layers 88, which tend to form the water droplets into larger droplets.

As the mixture passes into the settling space 95, the large water droplets gravitate into the sump 65 while the dry fuel passes transversely through the nonwater wettable layer 94, thence to chamber 64 from which it flows through the fuel outlet line 70. As the water collected within sump 65 rises, its height is indicated by the division line between it and the dry fuel supported on it, as viewed on the gauge 75. Accordingly, the valve 72' can be adjusted to drain the water from the sump 65 at a rate normally to maintain a proper level of water therein. Should, however, the accumulation of water within sump 65 increase too rapidly, the outlet valve 71 may be closed and the valve 74 opened so that the water and fuel within the sump 65 may be recirculated in the manner explained in connection with FIG. 1.

Although the various features of the new and improved apparatus for filtering liquid fuel have been shown and described in detail to fully disclose two embodiments of the invention, it will be evident that numerous changes may be made in such details and certain features may be used without others without departing from the principles of the invention.

What is claimed is:

1. Filtering apparatus for removing solids and water from a hydrocarbon fuel, comprising in combination a housing having an inlet and an outlet; a sump connected to said housing; baffle means within said housing; tubular filter means extending from said baffle means and having a portion of its interior in communication with said inlet, and another portion in communication with said sump; and means extending completely between said portions for causing water admixed with said fuel to coalesce, said means comprising a separating element compounded of a mass of coated fibers, the coating on said fibers including polyethylene and having formed therein a profusion of knob like protuberances, whereby said coalesced water separates from said fuel within that portion of said tubular filter means in communication with said sump and collects therein.

2. An apparatus as defined in claim 1 wherein said separating element has internal longitudinally extending ridges.

References Cited in the file of this patent

UNITED STATES PATENTS

| | | |
|---|---|---|
| 1,787,577 | Hills | Jan. 6, 1931 |
| 1,947,709 | Garrison | Feb. 20, 1934 |
| 2,522,378 | Kirkbride | Sept. 12, 1950 |
| 2,657,808 | Mankin | Nov. 3, 1953 |
| 2,725,986 | Marvel | Dec. 6, 1955 |
| 2,739,713 | Robinson | Mar. 27, 1956 |
| 2,772,995 | Wilson | Dec. 4, 1956 |
| 2,827,395 | Jordan | Mar. 18, 1958 |
| 2,864,505 | Kasten | Dec. 16, 1958 |

FOREIGN PATENTS

| | | |
|---|---|---|
| 750,099 | Great Britain | Nov. 22, 1954 |